Figure 1:
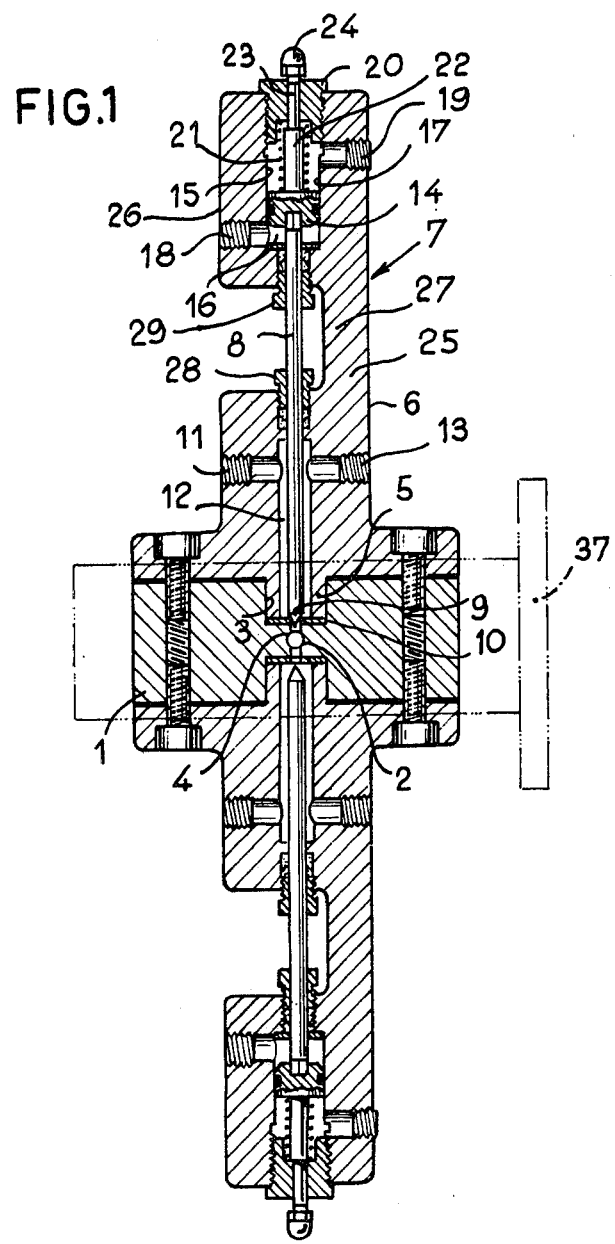

United States Patent [19]

Tchebinyayeff

[11] 4,306,587

[45] Dec. 22, 1981

[54] DEVICE FOR DISTRIBUTING PAINTS, SOLVENTS, VARNISHES OR THE LIKE

[75] Inventor: Michel R. Tchebinyayeff, Domont, France

[73] Assignee: Societe Carrier, Suresnes, France

[21] Appl. No.: 146,989

[22] Filed: May 5, 1980

[30] Foreign Application Priority Data

May 11, 1979 [FR] France .................................. 79 12038

[51] Int. Cl.³ .............................................. F16K 11/22
[52] U.S. Cl. .................................... 137/606; 137/884; 239/124; 239/417.5
[58] Field of Search ................... 137/271, 561 A, 606, 137/883, 884; 239/303–308, 412, 416.1, 417.5

[56] References Cited

U.S. PATENT DOCUMENTS

| | | | |
|---|---|---|---|
| 3,572,366 | 3/1971 | Wiggins | 137/606 X |
| 3,770,004 | 11/1973 | Johnson | 137/606X |
| 3,848,626 | 11/1974 | Smith | 137/884 X |
| 4,215,721 | 8/1980 | Hetherington | 137/606 |
| 4,231,392 | 11/1980 | Allibert | 137/606 X |

FOREIGN PATENT DOCUMENTS 1288391  1/1969  Fed. Rep. of Germany ...... 137/884

Primary Examiner—Robert G. Nilson
Attorney, Agent, or Firm—Sughrue, Mion, Zinn, Macpeak and Seas

[57] ABSTRACT

The distributor has a center passage provided in a body and conveying paint to spray means. Valves for putting the center passage in communication with conduits conveying paints of different tints are mounted on the body. The body constitutes with said valves a modular unit which may be juxtaposed with at least one similar modular unit. The body has at each end means for sealingly connecting the modular unit with a neighbouring modular unit.

5 Claims, 2 Drawing Figures

DEVICE FOR DISTRIBUTING PAINTS, SOLVENTS, VARNISHES OR THE LIKE

DESCRIPTION

The present invention relates to distributors of paints, solvents, varnishes or the like, and more particularly to distributing devices termed tint changers which are adapted to supply the product to spray guns successively with paints of different tints.

There are already known a number of paint distributors and in particular distributors having a centre channel which comprise, as their name indicates, a centre channel which is connected to at least one spray nozzle and valves which are pneumatically controlled for example, connecting said centre channel with pipes supplying paints of different colours or tints.

The known distributing devices have a number of drawbacks.

When they are of the unit type, their assembly for forming distributors of a plurality of tints requires the use of O-rings.

Although these rings provide a good seal they have a limited life and must be changed each time the distributor is dismantled.

Further, the use of sealing rings requires the provision in the parts to be assembled of grooves for receiving them and this increases the number of machining operations and consequently the cost of the distributor.

Other distributors of the aforementioned type comprise a series of valves carried by a body in which a centre channel is formed.

These distributors have the drawback of having no possibility of extension.

Further, the valves of the known paint distributors are relatively complex in construction and not easy to dismantle.

An object of the invention is to overcome the aforementioned drawbacks and to provide a paint distributor which is simple in construction and yet has great flexibility of utilization and is easy to assemble and dismantle.

The invention provides a paint distributor having a centre channel and comprising a body in which there is formed the centre channel for conveying the paint to spray means, valves putting said centre channel in communication with pipes conveying paints of different tints being mounted on said body, wherein said body constitutes with said valve a modular unit which may be juxtaposed with at least one similar modular unit and it comprises at each end of said body means for sealingly connecting said modula unit with a neighbouring unit.

Figure 2:
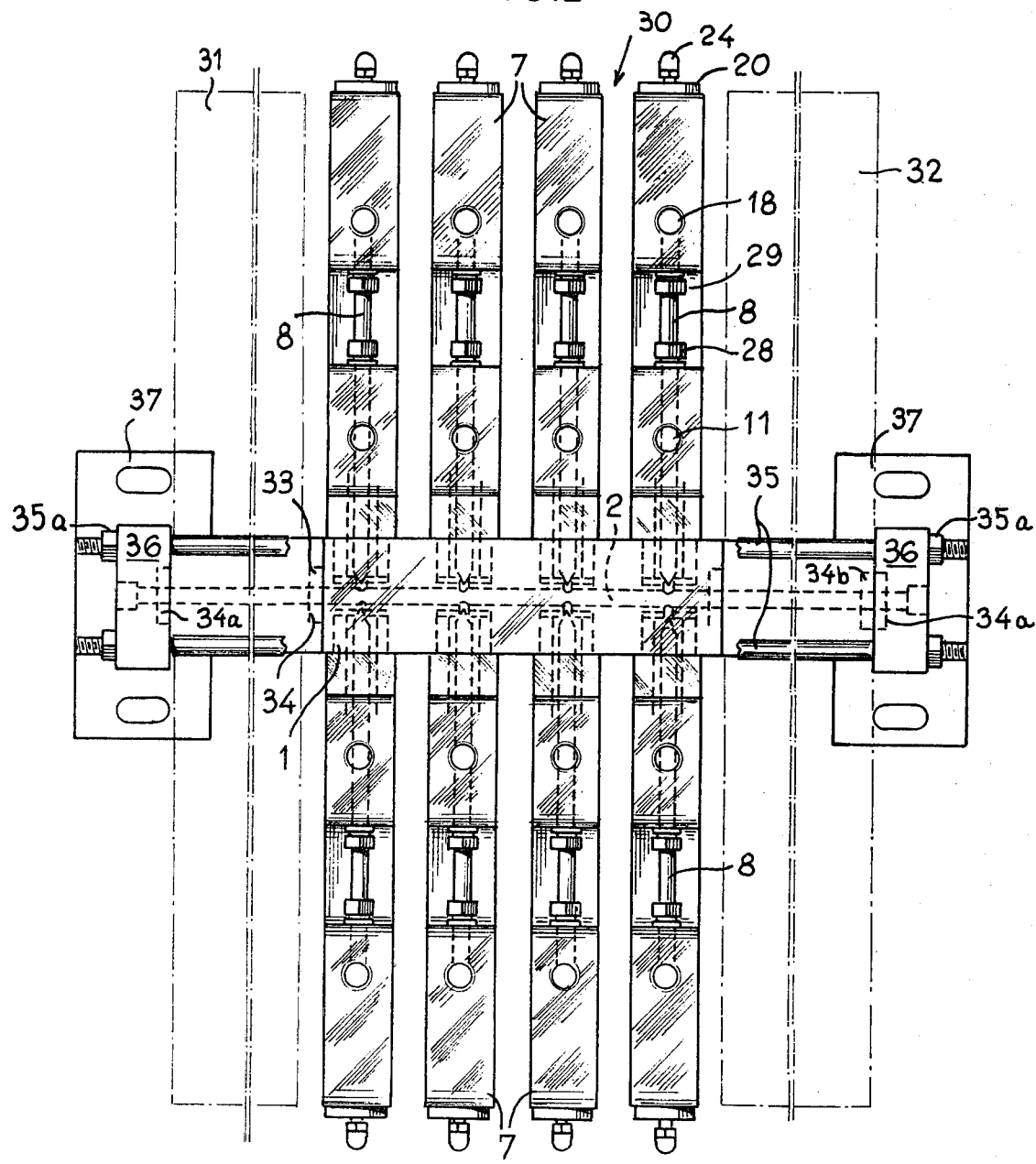

Further features of the invention will be apparent from the ensuing description with reference to the accompanying drawings which are given solely by way of example and in which:

FIG. 1 is a cross-sectional view of the distributing device according to the invention, and FIG. 2 is an elevational view of a paint distributor comprising a plurality of modula units according to the invention.

The paint distributing device shown in the drawings mainly comprises a body 1 having a generally parallel-sided shape in which is formed an axial passage 2 for conveying a product such as a paint, a varnish or other product to spray devices (not shown). Formed in the body 1, equally spaced apart, are recesses 3 having an axis perpendicular to the axis of the passage 2 and provided in the large sides of the parallel-sided body 1 and connected to the passage 2 through passages 4 of small diameter.

Each recess 3 of the body 1 receives a corresponding projection 5 of the body 6 of a valve 7 connecting the centre passage 2 to a conduit (not shown) which conveys a paint of a given tint.

Mounted in the valve body 6 to be movable in translation is a needle 8 whose point 9 closes or opens the corresponding passage 4 of connection to the centre passage 2. For this purpose, there is disposed in the bottom of each recess 3 a member 10 forming a seat for the point 9 of the needle 8. Formed in the valve body 6 is a conduit 11 for the entry of the paint, this conduit communicating with a chamber 12 surrounding the part of the needle 8 in the vicinity of the corresponding passage 4, and a conduit 13 for the recirculation of paint. At the end thereof opposed to the passage 4, the needle 8 carries a piston 14 which is mounted to be movable in translation in a cylinder 15 of the valve body 6, said piston defining with the cylinder a first chamber 16 and a second chamber 17 each of which is provided with an orifice 18, 19 for the entry of compressed air. The needle 8 is maintained in the valve body 6 by a screwthreaded plug 20 which is fixed to a screwthreaded end portion of the cylinder 15, a return spring 21 surrounding a rod 22 with the piston 14 being maintained between the plug 20 and this piston. The rod 22 has an extension 23 which extends through the plug 20 by way of a centre orifice of the latter and carries a nut 24 on its free end portion.

The valve body 6 comprises a portion 25 which constitutes a base containing the valve proper and a portion 26 containing the pneumatic control means of the valve, the two portions being interconnected by a thinner portion 27 which exposes a part of the needle 8. The seal between the needle 8 and the portions 25 and 26 of the valve body 6 is provided by packing-boxes 28 and 29 respectively.

The valve just described has with respect to conventional paint distributor valves a certain number of advantages.

The needle 8 is easily dismantled owing to the fact that it is maintained in position by a plug 20 which is accessible from outside the valve body.

The packing boxes 28 and 29, sealing the passage for the needle through the walls of the portions 25 and 26 of the valve body 6, are also accessible from outside and this considerably facilitates the valve maintenance operations. The seat 10 of the needle is made from brass which has been subjected to a chemical treatment which imparts thereto a hardness of 450 to 520 Vickers which is higher than that of the needle 8. These seats are interchangeable so that the life of the distributor is considerably increased.

The fact that the needle 8 cooperates at the end thereof opposed to the point 9 with a rod 22 provided with an extension 23 which extends out of the valve body, it is possible to see whether the valve is closed or open.

The presence of an orifice 13 for the recirculation of the paint enables the valve to be connected to a recirculation circuit of the paint wherein the valve is not used so that the product retains the required fluidity.

As can be seen in FIG. 1, each of the chambers 16 and 17 defined by the piston 14 and the cylinder 15 is provided with a respective orifice 18, 19 for the entry of compressed air. In this way it is possible to control the opening of the valve by applying the pressure of the compressed air to the orifice 18, in which case the valve is opened against the action of the return spring 21. The orifice 19 either permits reinforcing the action of the return spring 21 when it is necessary, or permits closing the valve.

The distributor shown in FIG. 2 comprises a first module 30 having a body 1 to which are fixed eight valves 7 which are identical to that described with reference to FIG. 1, and two other modules 31 and 32 represented by rectangles in dot-dash lines and identical to the first-mentioned modules. The respective bodies 1 of the modules 30, 31, 32 are assembled in end-to-end relation. For this purpose connecting means are provided between adjoining bodies which comprise a projection 33 provided at one end of a body 1, said projection entering a cavity 34 formed in an adjacent end of the body 1 of the neighbouring module. When assembling, the surfaces of the ends of the bodies 1 of the adjacent module are coated with a sealing paste based on Teflon which is commercially available under the trade mark LOCTITE. As shown in FIG. 2, the bodies 1 are held in position by tie rods 35 formed by screwthreaded rods cooperating with end members 36. Nuts 35a are screwed on the ends of the rods 35. The end members 36 are provided with fixing lugs 37 which perform the function of connecting means for connection to a support carrying spray devices (not shown). The left end member 36 shown in FIG. 2 has a cavity 34a for receiving the adjacent projection of the body 1 of the module 31 and the the right end member 36 also has a cavity 34a which receives a collar 34b which is engaged in the adjacent cavity of the body 1 of the module 32.

Each distributor body 1 comprises a section of a centre passage 2 which, when the distributor is associated with neighbouring distributors, forms the centre passage of the assembly thus formed. It will be understood that compressed air is supplied at the right end of passage 2 in FIG. 2 and the paint entrained by the compressed air issues from the left end of this passage in the direction of the spraying means (not shown).

Such an arrangement consequently permits the adaptation of the tint changing capacity of the paint distributor to any number of tints by a simple addition of successive modules. Further, as the assembly of the modules with each other is ensured with no sealing element, the bodies of the distributor are easier to machine and consequently cheaper.

Having now described my invention what I claim as new and desire to secure by Letters Patent is:

1. A paint distributor comprising a body in which there is formed a centre passage for conveying paint to spraying means, conduits conveying paints of different tints mounted on said body, valves interposed between said centre passage and the conduits for putting said passage in communication with the conduits, said body constituting with said valves a modular unit which is capable of being juxtaposed with at least one similar modular unit, means being provided at opposite ends of said body for sealingly connecting said modular unit to a neighbouring modular unit, said body having a parallel-sided shape and comprising recesses formed on at least one of its lateral sides, each recess being adapted to receive a projection of a corresponding valve body, passages of small diameter putting said recesses in communication with the centre passage, said distributor further comprising adjacent an end of each recess in the body a member having an aperture in alignment with the corresponding passage of small diameter and forming a seat, a needle which constitutes the moving member of the corresponding valve being cooperative with said seat, and said seat-forming member having a hardness higher than that of the needle.

2. A device as claimed in claim 5, wherein the valve has a body, a cylinder is formed in said valve body, and a piston carried by an end portion of the needle opposed to said seat is movable in the cylinder, the piston defining with the cylinder at least one chamber provided with a compressed air inlet orifice for the purpose of actuating the needle.

3. A distributor as claimed in claim 2, comprising a screwthreaded plug which is screwed in a screwthreaded end portion of the cylinder and maintains the needle in the valve body, a rod carried by the piston and having an extension which extends through the plug and out of the plug so as to form means whereby the open or closed state of the valve can be seen, and a return spring which is interposed between the piston and the plug and surrounds the piston rod.

4. A distributor as claimed in claim 2 or 3, wherein each valve body comprises a first portion forming a valve body proper, a second portion containing the cylinder and piston for actuating said valve, and a third portion of smaller section than the first portion and second portion interconnecting the first portion and second portion so as to expose a part of the needle, and packing boxes accessible from outside ensuring a seal between the needle and said first and second portions.

5. A paint distributor comprising a body in which there is formed a centre passage for conveying paint to spraying means, conduits conveying paints of different tints mounted on said body, valves interposed between said centre passage and the conduits for putting said passage in communication with the conduits, said body constituting with said valves a modular unit which is capable of being juxtaposed with at least one similar modular unit, means being provided at opposite ends of said body for sealingly connecting said modular unit to a neighbouring modular unit, said body having a parallel-sided shape and comprising recesses formed on at least one of its lateral sides, each recess being adapted to receive a projection of a corresponding valve body, passages of small diameter putting said recesses in communication with the centre passage, said distributor further comprising adjacent an end of each recess in the body a member having an aperture in alignment with the corresponding passage of small diameter and forming a seat, a needle which constitutes the moving member of the corresponding valve being cooperative with said seat, and said seat-forming member having a hardness different from that of the needle.

* * * * *